United States Patent
Gómez Pérez et al.

(10) Patent No.: US 8,498,761 B2
(45) Date of Patent: Jul. 30, 2013

(54) METHOD AND SYSTEM TO ASSIST CONVENTIONAL FIXED-WING AIRCRAFT LANDING, WITHOUT A RUNWAY

(75) Inventors: José Patricio Gómez Pérez, Madrid (ES); Ignacio Gómez Pérez, Madrid (ES); Antonio Monteagudo López De Sabando, Madrid (ES)

(73) Assignee: Universidad Politecnica de Madrid, Madrid (ES)

( * ) Notice: Subject to any disclaimer, the term of this patent is extended or adjusted under 35 U.S.C. 154(b) by 0 days.

(21) Appl. No.: 13/388,638

(22) PCT Filed: Jul. 16, 2010

(86) PCT No.: PCT/ES2010/000311
§ 371 (c)(1),
(2), (4) Date: Apr. 12, 2012

(87) PCT Pub. No.: WO2011/015679
PCT Pub. Date: Feb. 10, 2011

(65) Prior Publication Data
US 2012/0191274 A1 Jul. 26, 2012

(30) Foreign Application Priority Data
Aug. 5, 2009 (ES) .................................. 200930562

(51) Int. Cl.
*G06G 7/70* (2006.01)
(52) U.S. Cl.
USPC .......................................................... 701/18

(58) Field of Classification Search
None
See application file for complete search history.

(56) References Cited

U.S. PATENT DOCUMENTS

| 1,392,140 | A | 9/1921 | Gernsback | |
|---|---|---|---|---|
| 1,421,846 | A | 7/1922 | Scholfield | |
| 1,709,058 | A | 4/1929 | Brunner | |
| 4,700,912 | A | 10/1987 | Corbett | |
| 2004/0107027 | A1* | 6/2004 | Boudrieau | 701/1 |
| 2007/0029442 | A1 | 2/2007 | Wolter | |
| 2010/0001882 | A1* | 1/2010 | Jeddi | 340/961 |
| 2012/0234968 | A1* | 9/2012 | Smith | 244/12.3 |

FOREIGN PATENT DOCUMENTS

| EP | 0 579 508 | 1/1994 |
|---|---|---|
| RU | 2 005 669 | 1/1994 |
| RU | 2 005 672 | 1/1994 |

OTHER PUBLICATIONS

International Search Report for International Application No. PCT/ES2010/000311 mailed Dec. 1, 2010.

* cited by examiner

*Primary Examiner* — Thomas Tarcza
*Assistant Examiner* — Adam Alharbi
(74) *Attorney, Agent, or Firm* — Merchant & Gould P.C.

(57) ABSTRACT

A system allows conventional, unprepared fixed-wing aircraft to land safely on very small, unprepared areas, enabling an aerodynamic capacitance in which the airplanes can fly in a controlled manner against coherent air current, being assisted by a combined system including both the air current control mechanisms and the automatic flight control system of the aircraft.

11 Claims, 6 Drawing Sheets

METHOD AND SYSTEM TO ASSIST CONVENTIONAL FIXED-WING AIRCRAFT LANDING, WITHOUT A RUNWAY

This application is a National Stage Application of PCT/ES2010/000311, filed 16 Jul. 2010, which claims benefit of Ser. No. P200930562, filed 5 Aug. 2009 in Spain and which applications are incorporated herein by reference. To the extent appropriate, a claim of priority is made to each of the above disclosed applications.

BACKGROUND

The present invention is encompassed in the following fields of the art: aeronautic sector, aerospace sector, high lift devices, automatic flight control systems.

Since the landing of aircraft involves a dangerous situation in addition to needing the existence of suitable installations, inventions and methods intended to assist and facilitate landing thereof in the safest and least expensive manner possible have been carried out throughout the hundred years of practical aviation history.

Besides the most common solution of building suitable airport installations and designing conventional human assisted or automated landing and takeoff systems and improving air traffic control, inventive effort is made in order to obtain systems, methods and devices which allow landing an aircraft in smaller installations or in less equipped installations or, at best, in non-equipped installations.

In that sense, some patent documents of devices and methods intended to solve the aeronautical problem for aiding the landing of aircraft on unprepared or short runways are known.

The patents mentioned and discussed below are those that seem to be the closest to the solution presented in the present invention.

Patent document EP0579508-A1: A device produces an uncontrolled horizontal air current which being added to the air current striking an aircraft approaching a conventional runway, slows the aircraft down, facilitating its landing in a shorter space.

However the objective sought in the present invention is not to generate an opposing air current which slows down the aircraft but to replace the volume of air in which the aircraft moves with another volume of air, in a smooth and controlled manner, the characteristics of which are under the control of a system which automatically adapts them to the flight conditions of the aircraft by means of coordinating with the flight control system thereof. Therefore, the horizontal air current is not uncontrolled, but is kept coherent and airworthy by means of the corresponding flow control systems, such that an aircraft can maneuver therein maintaining the full aerodynamic control. The term coherent is a physics term applied in aerodynamics and in laser optics meaning that the movement of all the particles is parallel to the general flow direction.

Patent documents U.S. Pat. No. 4,700,912 and US2007/0029442-A1: A device captures the aircraft in an air column supporting the aircraft from below such as on a tray and places it on a certain surface.

However, the objective sought in the present invention is not to support the aircraft from below by means of injecting an air jet which is capable of keeping the aircraft suspended due to its aerodynamic resistance, but to provide a volume of air in which the aircraft can hover according to the aerodynamic principles for which it has been designed.

Additionally, the present invention has a simpler approach based on cheaper and more portable devices, such that they can easily be moved to non equipped areas in which providing aircraft landing points is desirable. On the other hand, the present invention is easier to carry out and proposes building systems and installations in which the aircraft evolve according to their design principles without being forced to fly against an uncontrolled gale or to ride on a vertical air jet, both situations presenting a high intrinsic hazard.

SUMMARY

The invention relates to a system to assist conventional fixed-wing aircraft landing without a runway.

The system comprises:
a not-on-board installation which in turn comprises:
  air potential generating means responsible for providing air in adjustable pressure and flow rate conditions to laminar airflow generating means;
  laminar airflow generating means responsible for generating a laminar air current from the air supplied by the air potential generating means;
  airflow control means responsible for controlling the air potential generating means and laminar airflow generating means to obtain a controlled laminar air current;
  communication means for communicating with the aircraft responsible for:
    communicating information about the conditions of the generated laminar air current to the flight control system of the aircraft. The speed modulus of the generated air and its angles of orientation are points of the generated current, as well as the static pressure and the temperature in the vicinity of the not-on-board installation. The flight control system of the aircraft uses this information to automatically calculate the command thereof;
    receiving information about the flight conditions on the approach of the aircraft from the flight control system of the aircraft and communicating them to the airflow control means;
  trajectory generating means responsible for calculating and providing the aircraft a trajectory to be followed by the aircraft through the communication means to guide it to a collection area. The trajectory generating means calculate a glide slope guiding the aircraft to the collection area. It is dynamically calculated from the flow rate of generated air (section and speed) and from its direction in space;
  aircraft collecting and immobilizing means responsible for immobilizing the aircraft in the collection area once the aircraft has reached said collection area;

The airflow control means are configured for obtaining the controlled laminar air current with the suitable conditions to maintain the airworthiness of the aircraft depending on its approach conditions. The approach conditions are obtained by means of communicating with the aircraft and by means of the position and attitude sensors of the aircraft from the not-on-board installation. Some parameters are obtained from the sensors of the not-on-board installation and others are communicated by the control system of the aircraft.

The laminar airflow generating means preferably comprise:
  a pooling chamber responsible for containing a specific volume of air in the thermodynamic conditions provided by the air potential generating means;
  at least one purge valve responsible for relieving the pressure of the pooling chamber when it is activated to obtain the suitable thermodynamic conditions;

at least one nozzle responsible for exchanging the thermodynamic conditions of the air contained in the pooling chamber with those necessary to form a laminar air current having a section suited to the aircraft;

a plurality of horizontal guide blades and vertical guide blades responsible for varying the direction of the generated laminar air current to perform a lateral and vertical control of said air current, respectively.

The airflow control means preferably comprise:

sensor means responsible for obtaining the conditions of the laminar air current and the state of the air potential generating means and the laminar airflow generating means. The air current is controlled by means of a system which takes into account the state of the machine itself, in addition to the value of the parameters of the current produced;

control means configured for controlling the air potential generating means and the laminar airflow generating means depending on control signals;

data processing means responsible for generating said control signals depending on the information supplied by the sensor means and on the approach conditions of the aircraft.

The aircraft collecting and immobilizing means preferably comprise:

a landing platform which can be lifted by means of an articulated mechanism;

lifting means of the landing platform responsible for lifting the landing platform and bringing it closer to the aircraft when it is in the collection area;

fixing and anchoring device responsible for immobilizing the aircraft in the collection area, said device being able to comprise a battery of electromagnets arranged in the landing platform;

sensor means responsible for establishing the position of the fixing and anchoring device and the position of the aircraft;

control unit configured for controlling the lifting means of the landing platform and the actuation of the fixing and anchoring device depending on the position of the aircraft.

The trajectory generating means can comprise a first GPS unit—not in an exclusive manner, since said means could, for example, be based on radar—in the not-on-board installation and data processing means configured for:

receiving the GPS position from the first GPS unit;

receiving the GPS position of the aircraft from a second on board GPS unit;

receiving the altitude of the aircraft from an altimeter on board the aircraft;

generating the trajectory depending on at least:
the readings from the first and second GPS units;
the reading from the on board altimeter;
the reading from the on board and not-on-board air sensors. The air sensors are a standard set of measuring apparatuses in aerodynamics. They can be made up of different devices, but all of them provide knowledge of the dynamic and static pressure and the direction thereof with respect to a global referencing system of the air current which surrounds the aircraft or which is produced by the air generating system.

The system preferably comprises a platform responsible for supporting the not-on-board installation.

The approach conditions comprise at least:
speed of the aircraft;
position of the aircraft;
deflection of its control surfaces (ailerons, elevator, rudder, flaps, slats, spoilers).

In a preferred embodiment the system also comprises an installation on board the aircraft which in turn comprises:

a flight control system responsible for:
receiving information about the conditions of the generated laminar air current and the trajectory to be followed by the aircraft from the not-on-board installation to reach the collection area;
controlling the aircraft depending on at least said received information,
sending information about the flight conditions on the approach of the aircraft to the not-on-board installation.

The installation on board the aircraft can additionally comprise immobilizing and anchoring means compatible with the aircraft collecting and immobilizing means of the not-on-board installation, to jointly immobilize the aircraft in the collection area.

The immobilizing and anchoring means of the installation on board the aircraft can comprise:

landing gear compatible with the aircraft collecting and immobilizing means of the not-on-board installation;

a battery of electromagnets geometrically compatibles with the electromagnets of the aircraft collecting and immobilizing means of the not-on-board installation;

a control unit responsible for controlling the intensity of the electric current powering the battery of electromagnets of the aircraft depending on the position of the aircraft during the guiding maneuver.

On the other hand, another aspect of the invention is to provide a method to assist conventional fixed-wing aircraft landing without a runway. The method comprises:

a not-on-board installation generating an adjustable laminar air current directed against the forward movement of the aircraft;

the not-on-board installation periodically providing the aircraft with a trajectory to be followed to guide it to a collection area;

the not-on-board installation obtaining the approach conditions of the aircraft.

The approach conditions are the position and angles with respect to a global referencing system, the speed also referred to the referencing system, the deflections of the control surfaces and the engine speed;

controlling the laminar air current with the suitable conditions to maintain the airworthiness of the aircraft depending on the approach conditions of the aircraft;

immobilizing the aircraft in the collection area once the aircraft has reached said collection area by means of aircraft collecting and immobilizing means.

BRIEF DESCRIPTION OF THE DRAWINGS

FIGS. 3 to 10 show the process whereby the system operates in an illustrative manner:

DESCRIPTION OF A PREFERRED EMBODIMENT OF THE INVENTION

A system to aid the landing of fixed-wing aircraft without a runway and for its associated operating process is presented. This system allows a conventional aircraft to land in a small, unprepared area, by means of generating a low turbulence and high coherent air current which allows the aircraft to fly and maneuver in a controlled manner and according to the aerodynamic principles for which it has been designed. The conditions of that current are controlled by means of a system communicating with the flight control system of the aircraft, such that both are coordinated so that the aircraft follows a trajectory which smoothly introduces it into the air current and keeps its speed and the deflection of its control surfaces at the conditions of the air current, which in turn, vary gradually until the aircraft is stopped.

This system can be used, for example, in fixed installations for aircraft with a small wingspan (FIGS. 1 to 10), in mobile installations for recovering small unmanned aircraft, in fixed installations for commercial aircraft, or in installations on board the ships for military naval aircraft, applying the power scaling and adjustment criteria, but respecting the philosophy of the invention.

The system object of the invention is made up of the following elements:
  a) Not-on-board installation (i.e., not present on the aircraft).
  b) On board installation (on the aircraft).
  c) Interaction logic.

Each of the elements, its functions and the relationship existing between them are described below.

a) Not-on-Board Installation

Figure 1:
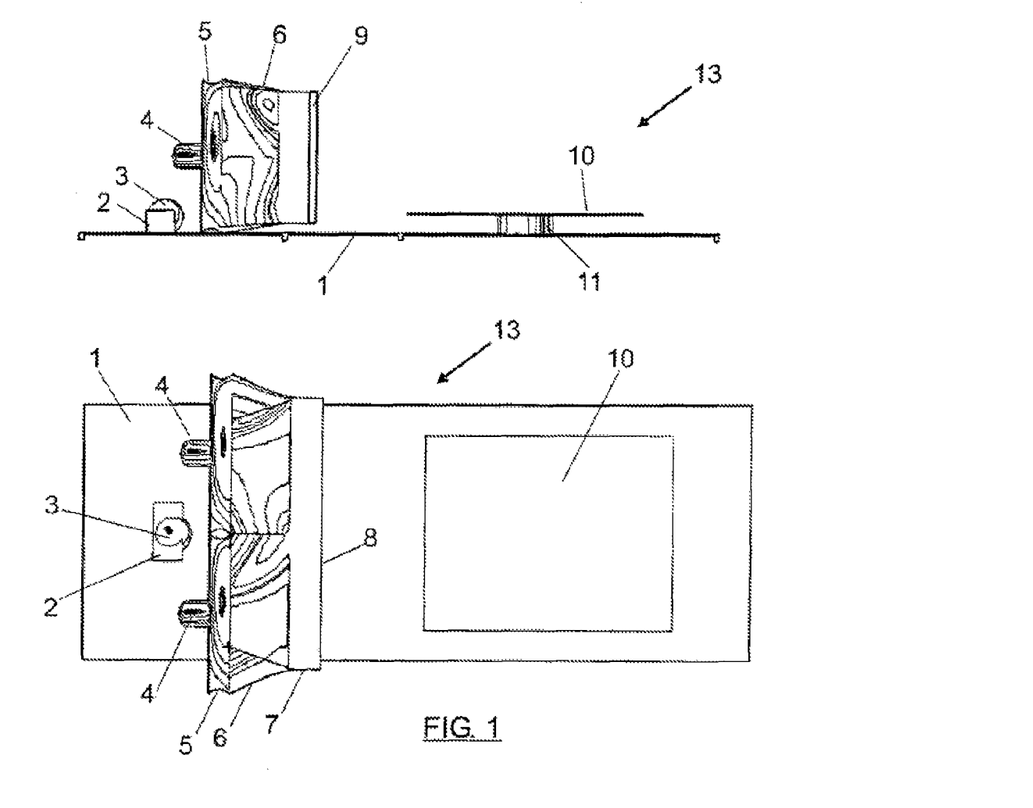
FIG. 1 schematically shows the straight projections of the not-on-board installation.
Figure 2:
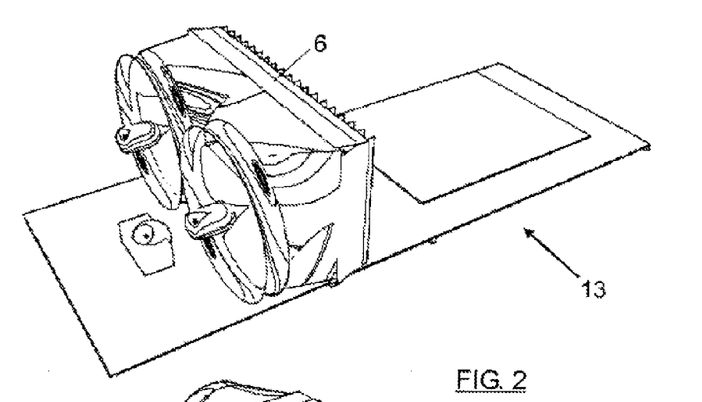
FIG. 2 schematically depicts the conical projections of the not-on-board installation.

Not-on-board installation 13 is defined as the assembly of components which are not on the aircraft and its ordered arrangement in a land area (no necessarily conditioned for the landing of aircraft). FIGS. 1 and 2 schematically depict the not-on-board installation 13, supported on a platform 1 fixed to the ground or to a vehicle, having the following elements or sub-systems:
  1. Coherent and controlled laminar air flow rate generating system which is in turn made up of the following sub-systems:
    I. Air potential generating sub-system. The function of this sub-system is to provide air to a pooling chamber 6 in the pressure and flow rate conditions necessary to be converted into a laminar current having the section suitable for the specific application of the installation. It can, for example, consist of a battery of fans 4 and 5, or of a turbojet installation with water injection in the outlet nozzle to cool the air for a larger sized application.
    II. Laminar airflow generating sub-system the function of which is to convert the air produced by the air potential generating sub-system into a non-turbulent laminar current of the section suitable for the specific application of the installation. To that end, it has the following components:
      Pooling chamber 6 the function of which is to contain a specific volume of air in the thermodynamic conditions provided by the air potential generating sub-system.
      Purge valves 7 for the rapid control of the air flow rate, the function of which is to relieve the pressure of the pooling chamber 6 when obtaining the suitable thermodynamic conditions is necessary.
      Nozzle of the pooling chamber 6, the function of which is to exchange the thermodynamic conditions of the air contained in the pooling chamber with those necessary to form a coherent laminar current of the section suitable for the specific application of the installation.
      Horizontal guide blades 8 and vertical guide blades 9, the function of which is to vary the direction of the generated air current for the lateral and vertical control of the air current, respectively.
    III. Airflow control means or sub-system 2 the function of which is to control the air current control mechanisms to assure that the air current has the conditions of speed, section, length and turbulence suitable for maintaining the airworthiness of the aircraft for which the installation has been designed. The airflow control means are thus configured to obtain the controlled laminar air current with the suitable conditions for maintaining the airworthiness of the aircraft depending on its approach conditions. The approach conditions are obtained by means of communicating with the aircraft and by means of the aircraft position and attitude sensors 12 of the not-on-board installation. several technologies, for example, radar or a camera with an image processing system. This sub-system is made up of:
      Sensors the function of which is to provide the information about the state of the different parts of the laminar air flow rate generating system to the control sub-system so that it can calculate the control signals of each of the control mechanisms.
      Control mechanisms the function of which is to control each of the sub-systems and components to obtain the desired airflow conditions.
      Control laws the function of which is to calculate the control signals of each of the control mechanisms of the laminar air flow rate generating system from the information supplied by the sensors and by the interaction logic. These control laws are implemented in the form of control software.
      Control software the function of which is to implement the control laws in the form of a code which can be executed in the suitable hardware.
      Control hardware the function of which is to house the control software of the airflow control sub-system and all the peripheries necessary to enable its operation.

2. Not-on-board part of the communication sub-system for communicating with the flight control sub-system the function of which is to communicate the information about the conditions of the air current generated by the laminar air flow rate generating system to the flight control system and to communicate the information about the aircraft attitude and position to the air-flow control sub-system 2. Attitude is a term used in aerodynamics to refer to the spatial orientation of the aircraft with respect to a specific referencing system. The not-on-board part is made up of:
  I. Not-on-board antenna.
  II. Necessary hardware.
  III. Communications software.
3. Glide slope generating system 3 the function of which is to calculate and provide the aircraft with a trajectory leading it safely from the maneuver starting point to the collection point. This system can be implemented in different manners and using different technologies, depending on the glide slope preparation and tracking strategy to be adopted. A conventional ILS (Instrumental Landing System), for example, is one of the possible glide slope generating systems which can be integrated in the not-on-board installation 13.
4. Aircraft collection and immobilizing system the function of which is to capture and immobilize the aircraft at the time in which the aircraft has been stopped with respect to the ground, but flying in a controlled manner with respect to the air current supplied by the laminar air flow rate generating system. In a preferred embodiment, this system has the following components:
  I. Structure integral with the ground.
  II. Articulated mechanism the function of which is to bring the fixing device closer to the aircraft following a trajectory which does not put the aircraft in danger.
  III. Motors which allow the accurate moving and positioning of the articulated mechanism.
  IV. Fixing and anchoring device the function of which is to capture and immobilize the aircraft. This device can be constructed according to several possible technologies.
  V. Sensors the function of which is to establish with precision the position of the fixing and anchoring device and of the aircraft.
  VI. Control system of the aircraft collection and immobilizing system the function of which is to control the motors which allow the accurate moving and positioning of the articulated mechanism and the actuation of the fixing and anchoring device. This control system is implemented in the form of control software.
  VII. Control hardware the function of which is to house the control software of the aircraft collection and immobilizing system and all the peripheries necessary to enable its operation.

b) On Board Installation

On board installation is defined as the assembly of components which are in the aircraft so that it can safely use the installation object of this detailed description. These are:
1. Flight control system the function of which is to automatically control the aircraft, calculate the correct deflections of its flight control surfaces—deflections are the angles rotated by the flight control surfaces which in turn are the ailerons, flaps, slats, horizontal stabilizer and rudder- and the drive (or the traction) of its power plant at all times and at all the points of the glide slope (trajectory followed by the aircraft). This flight control system, unlike the existing ones, acts in collaboration with the airflow control sub-system of the not-on-board installation 13 to control the aircraft safely inside the air current generated by the mentioned installation. This system is made up of:
  I. Conventional flight control system the implementation of which depends on the technology and control strategy followed.
  II. On board part of the communication sub-system for communicating with the airflow control sub-system the function of which is to communicate the information about the attitude and position of the aircraft to the airflow control sub-system and to communicate the information about the conditions of the air current generated by the laminar air flow rate generating system to the flight control system. It is made up of:
    On board antenna.
    Necessary hardware.
    Communications software.
2. On board positioning, immobilizing and anchoring sub-system compatible with the aircraft collection and immobilizing system of the not-on-board installation 13. This sub-system, like that of the not-on-board installation 13, can be implemented in different manners depending on the technology or strategy selected.

c) Interaction Logic

Interaction logic is what relates the coordinated operation of the three control systems described in the sections above (flight control system of the aircraft, control system of the aircraft collection and immobilizing means and airflow control system). It acts by providing the instructions which must be fulfilled by each of the control systems such that the controlled and safe operation of the aircraft inside the air produced by the laminar air flow rate generating system are achieved. Physically, this logic is implemented in the form of control laws of a control software in which the inputs are the measured conditions of the air current, the state variables of the aircraft control system and the linear and angular relative positions of the aircraft collection and immobilizing system; and the outputs are the desired state trajectories of the three control systems.

Although they have described separately, both the control software and the necessary hardware (not-on-board) can be implanted inside a single control system.

d) Operating Process:

To provide a clearer idea of the invention, the operation protocol of the system is described below.

Figure 3:
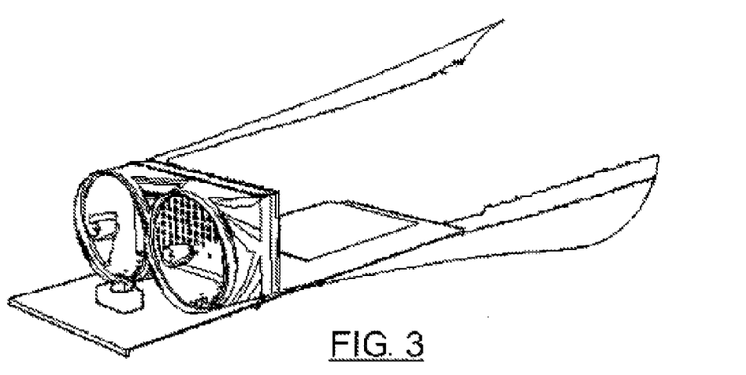
FIG. 3 shows step 1: executing the start up and stationary operation protocols.

Step 1:

Executing the protocols of starting up the flow rate generator and calibrating the sensors (as shown in FIG. 3).

Step 2:

Establishing communication between the control system of the airflow generator and the flight control system of the aircraft.

Figure 4:
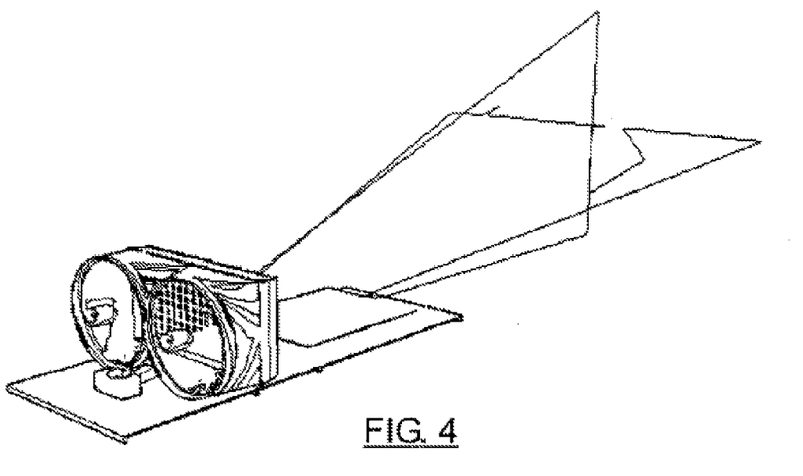
FIG. 4 shows steps 2 and 3: communicating with the aircraft and switching on the ILS to establish the most suitable descent path.
Figure 5:
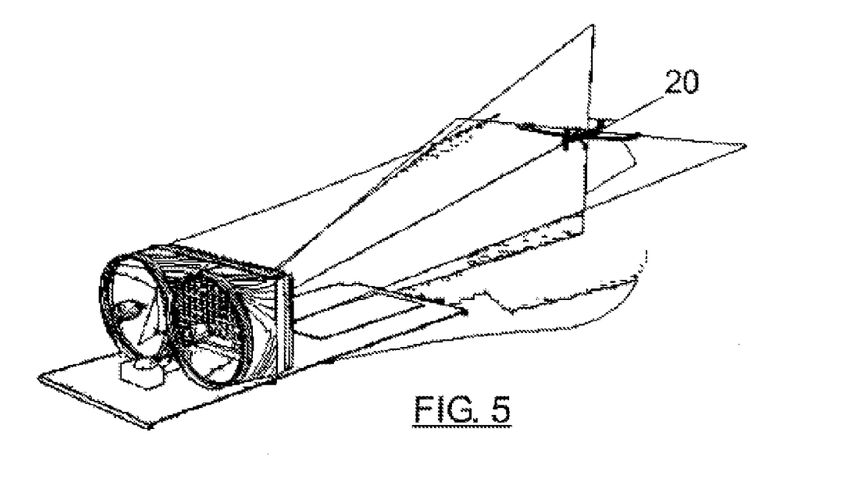
FIG. 5 depicts, within step 4: the aircraft moves closer to the capturing device following the landing path established by the ILS and gradually reduces its speed with respect to the ground.
Figure 6:
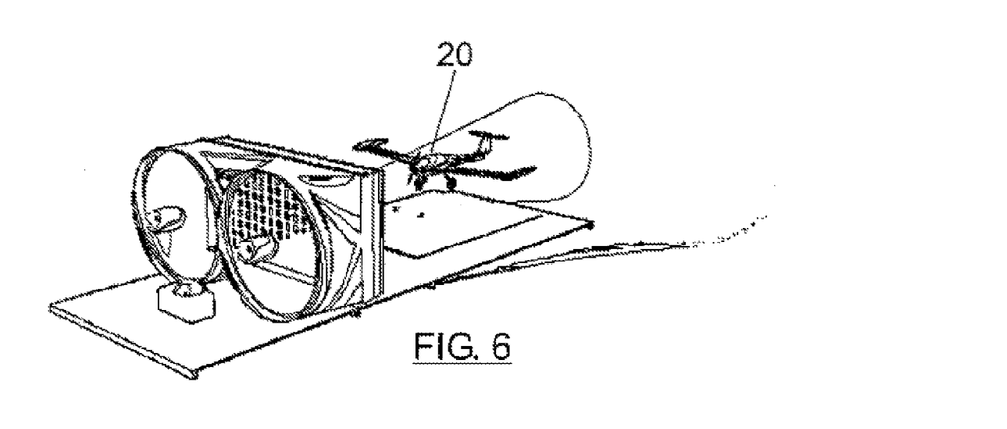
FIG. 6 shows, within step 4: the sensors of the capturing device feedback the exact position and attitude of the aircraft to the flow rate control system which carries out an accurate positioning of the aircraft on the collection area.
Figure 7:
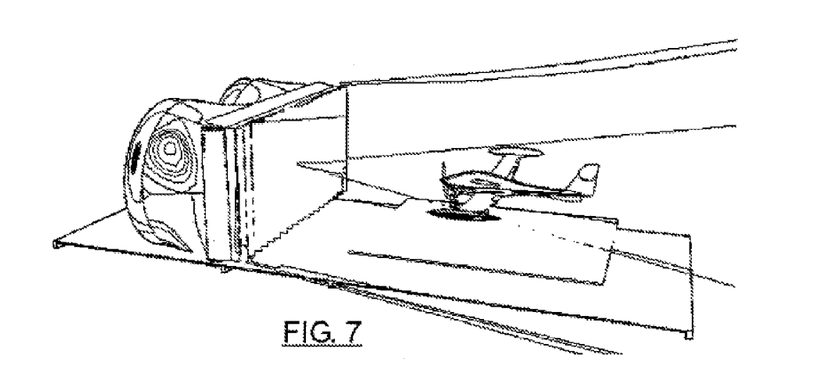
FIG. 7 depicts, within step 4: the aircraft is stopped with respect to the ground, flying against the current, while keeping its aerodynamic and propulsive control intact.

Step 3:

Activating the landing system instrumental for providing a landing path intercepting the airflow produced by the flow rate generator (see FIG. 4). The control system on board the aircraft in turn reduces its speed to the minimum working speed which is always greater than stalling speed.

Step 4:

The aircraft 20 follows the glide slope and submerges little by little into the frontal airflow opposite its flight direction. The aircraft 20 gradually slows down until it flies hovers with respect to the ground, but with minimum working speed with respect to the air current generated by the capturing device. At the same time, in a coordinated manner, the flow control system guides the flow rate produced by the air generator by means of its rotation speed, the purge valves 7 of the pooling chamber 6 and the horizontal guide blades 8 and vertical guide blades 9 orienting the air current, correcting the position and attitude deviations of the aircraft 20 with respect to the hovering flight (see FIGS. 5, 6 and 7).

Step 5:

The articulated mechanism 11 of the collection and immobilizing sub-system which always keeps its contact surface parallel to the airflow moves closer to the aircraft 20 and contacts the landing gear of the aircraft 20. The combined effect of the flow control system and of the flight control system of the aircraft, compensates the ground effect and reduces the lift of the aircraft 20, such that its weight is being gradually transferred from the air to the capturing device gradually. Alternatively, the aircraft 20 could descend towards a fixed platform by similar means (see FIGS. 8 and 9)

Figure 8:
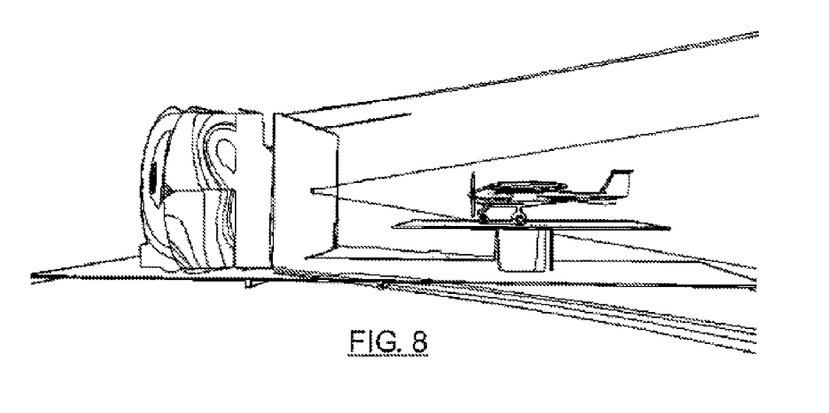
FIG. 8 shows, within step 5: the collection device is brought closer to the aircraft.
Figure 9:
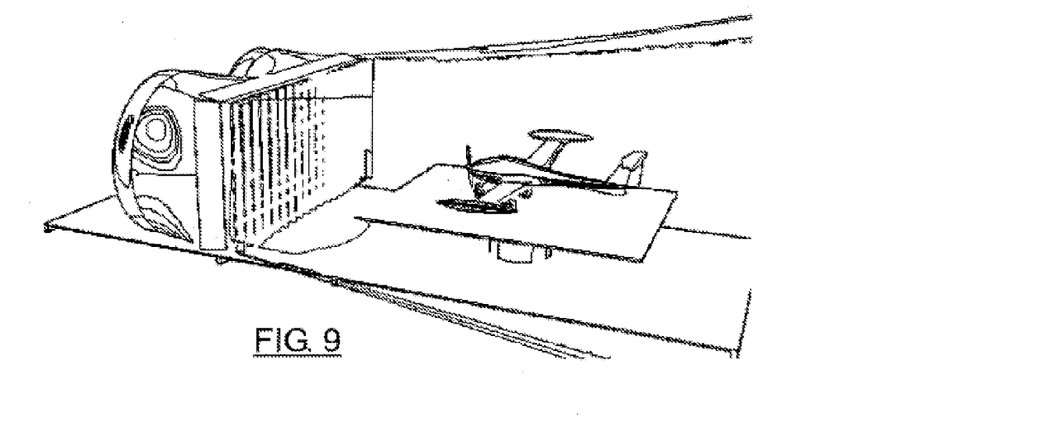
FIG. 9 shows, within step 5: the aircraft is positioned, anchored and oriented by means of a mechanical or electromechanical system.

The aircraft 20 can be provided with a magnetic anchoring system in its landing gear. If it is so, upon moving closer to the landing platform 10, a magnetic field is generated by means of electromagnets arranged in the landing platform 10 which guide the landing gear of the aircraft to its optimum position, and once there, capture it. In any case, the aircraft 20 can be immobilized by means of the technology which is considered most suitable for the specific application for which the installation has been sized.

Figure 10:
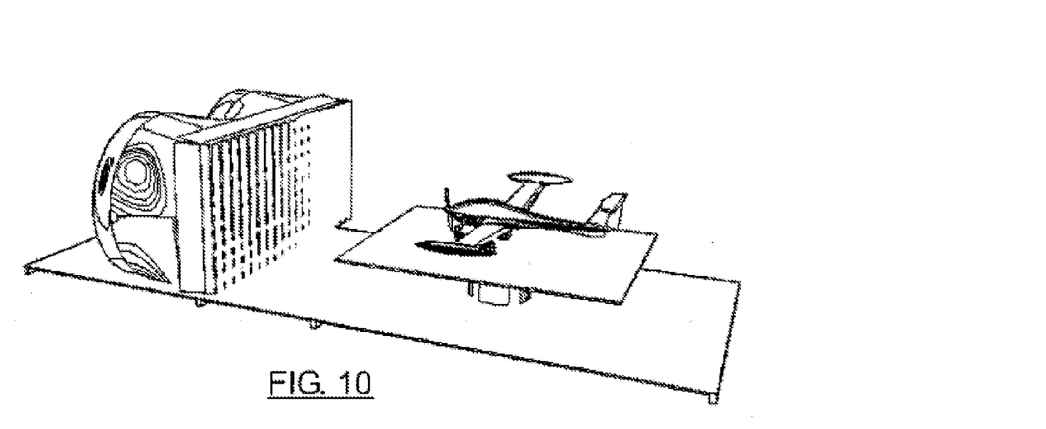
FIG. 10 shows step 6: the airflow and the propulsive force are stopped in a coordinated manner and one can access or disembark from the aircraft.

Step 6:

The aircraft 20 gradually reduces the power of its propulsion system such that the plane stays still, the flow rate is reduced until the air current is stopped. The aircraft has landed on the landing platform 10 and the airflow has been stopped (FIG. 10).

An embodiment of the invention applied to an installation for assisting the landing of unmanned aircraft with a wingspan less than five meters is described below. The most characteristic constitutive elements of the system are characterized.

a) Not-on-Board Installation 13

It is made up of the following sub-systems and devices according to the general architecture proposed:

1. Coherent and controlled laminar air flow rate generating system which is in turn made up of the following sub-systems:
   I. Air potential generating sub-system Battery of ten fans of a meter in diameter, arranged side by side in two rows of five. Each is moved by an electric motor. They have a rotation speed control circuit.
   II. Laminar airflow generating sub-system which is in turn made up of the following components:
      Single pooling chamber having rectangular cross-section. With pressure and temperature sensors.
      Four purge valves each located in one of the walls of the pooling chamber. Driven by electric actuators. With angle of opening sensors.
      Horizontal nozzle having a rectangular cross-section.
      Battery of flat horizontal guide blades and vertical guide blades, driven by electric actuators, with horizontal and vertical deflected angle sensors.
   III. Airflow control sub-system made up of:
      Sensors submerged in the laminar air current: pitot tubes and vanes. Said sensors are at the outlet of the laminar flow generator. The pitot tubes measure the static and dynamic pressures of the air current, which allows the calculation of the three components from the speed thereof, whereas the vanes measure the direction of the airflow in which they are submerged.
      Airflow control logic calculating the rotation speed of the electric motors, the angles of opening of the discharge valves and the deflections of the guide blades depending on the desired conditions of the air current supplied by the interaction logic.
      Control software implementing the airflow control logic in the form of control laws computable by an electronic system which accepts the readings from the sensors and produces control signals for the actuators.
      Control hardware in the form of a computer with data acquisition cards shared by the entire not-on-board installation 13.
2. Not-on-board part of the communication sub-system for communicating with the flight control sub-system. It is made up of:
   I. Not-on-board antenna having suitable sizes and shape.
   II. Communications software.
   III. Necessary hardware shared with the entire not-on-board installation 13.
3. Glide slope generating sub-system made up of:
   I. Differential GPS. A GPS unit located in the outlet of the nozzle of the laminar airflow generating sub-system and another identical unit on board the aircraft.
   II. Glide slope generating logic calculating each point thereof depending on the readings from the GPS's, from the on board and not-on-board air sensors and from the on board ultrasound altimeter.
   III. Control software implementing the glide slope generating logic in the form of control laws computable by an electronic system which accepts the readings from the sensors and produces control signals for the actuators.
   IV. Control hardware shared by the entire not-on-board installation 13.
4. Aircraft collection and immobilizing sub-system having the following differentiating components:
   I. Structure integral with the ground.
   II. Articulated mechanism in the form of a platform (landing platform 10) with position sensors.
   III. Electric motors which allow the accurate moving and positioning of the articulated mechanism with displacement sensors.
   IV. Electromagnetic fixing and anchoring device formed by:
      Battery of electromagnets arranged in the contact points of the landing gear of the aircraft with the landing platform 10 of the articulated mechanism.
   V. Control system of the aircraft collection and immobilizing system. It is made up of:
      Articulated mechanism movement logic controlling the vertical position of the landing platform 10 for collecting the aircraft depending on the position of the aircraft at every moment of the guiding, fixing and anchoring maneuver.
      Magnetic field modulating logic controlling the intensity of the electric current powering the electromagnets depending on the position of the aircraft at every moment of the guiding, fixing and anchoring maneuver.
      Control software implementing the articulated mechanism movement logic and magnetic field modulating logic in the form of control laws computable by an electronic system which accepts the readings from the sensors and produces control signals for the actuators.
      Control hardware shared by the entire not-on-board installation 13.

5. Power generating set of alternative diesel engine type, electric current generator to power the entire not-on-board installation 13.
6. Necessary safety and signaling equipment.
7. All the mechanical, chemical and electronic components necessary for the correct collective implementation and operation of all the differentiating elements described, b) On Board Installation It is made up of the following sub-systems and devices according to the general architecture proposed:

1. Flight control sub-system
   I. Logic controlling the dynamic of the aircraft, calculating the control vector at every moment depending on the readings from the sensors and from the state vector demanded by the pilot of the aircraft, by the navigation system or by the interaction logic.
   II. Control software implementing the logic of the flight control system in the form of control laws computable by an electronic system which accepts the readings from the sensors and produces control signals for the actuators.
   III. Control hardware shared by the entire not-on-board installation 13.
2. On board part of the communication sub-system for communicating with the airflow control sub-system which is made up of:
   I. On board antenna of suitable size and shape.
   II. Communications software.
   III. Necessary hardware shared with the entire on board installation.
3. On board positioning, immobilizing and anchoring sub-system compatible with the aircraft collection and immobilizing system of the not-on-board installation 13. It is made up of:
   I. Landing gear compatible with the aircraft collection and immobilizing system of the not-on-board installation 13.
   II. Battery of electromagnets geometrically compatible with those of the aircraft collection and immobilizing system of the not-on-board installation.
   III. Magnetic field modulating logic controlling the intensity of electric current powering the electromagnets depending on the position of the aircraft at every moment of the guiding, fixing and anchoring maneuver.
   IV. Control software implementing the magnetic field modulating logic in the form of control laws computable by an electronic system which accepts the readings from the sensors and produces control signals for the actuators.
   V. Control hardware shared by the entire on board installation.

c) Interaction Logic

It is implemented in the following manner according to the general architecture proposed:

1. Approach flight control logic providing a desired state vector to the flight control sub-system and to the airflow control sub-system, such that both work together to control the aircraft, calculating: the rotation speed of the electric motors of the fans, the angles of opening of the discharge valves and the deflections of the guide blades of the airflow control sub-system; and the deflections of the control surfaces and the demanded power to the power plant of the aircraft to obtain the desired landing path.
2. Control software implementing the approach flight control logic in the form of control laws computable by an electronic system which accepts the readings from the sensors and produces control signals for the actuators.
3. Control hardware shared by the entire not-on-board installation 13.
4. Connections to the flight control sub-systems (wireless) and airflow control sub-system (physical).

The invention claimed is:

1. A system to assist conventional fixed-wing aircraft landing without a runway, said system comprising:
   a) a not-on-board installation which comprises:
      air potential generating means for providing air in adjustable pressure and flow rate conditions to;
      laminar airflow generating means for generating a laminar air current from the air supplied by the air potential generating means;
      airflow control means for controlling the air potential generating means and laminar airflow generating means to obtain a controlled laminar air current;
      communication means for communicating with the aircraft responsible for:
         communicating information about the conditions of the generated laminar air current to the flight control system of the aircraft;
         receiving information about the flight conditions on the approach of the aircraft from the flight control system of the aircraft and communicating the flight conditions to the airflow control means;
      trajectory generating means for calculating and providing the aircraft with a trajectory to be followed by the aircraft through the communication means to guide the aircraft to a collection area;
      aircraft collecting and immobilizing means responsible for immobilizing the aircraft in the collection area once the aircraft has reached said collection area;
   wherein the airflow control means in cooperation with the flight control system of the aircraft and with interaction logic are configured for obtaining the controlled laminar air current with suitable conditions to maintain airworthiness of the aircraft in real time, depending on its approach conditions, the conditions of the generated current and the calculation of the trajectory by control hardware housing the interaction logic;
   b) an installation on board the aircraft which in turn comprises:
      flight control system responsible for:
         receiving information about the conditions of the generated laminar air current and the trajectory to be followed by the aircraft from the not-on-board installation to reach the collection area;
         receiving the control strategy defining the control of the aircraft from the control hardware housing the interaction logic;
         controlling the aircraft depending on at least said received information;
         sending information about the flight conditions on the approach of the aircraft to the not-on-board installation;
         sending information about the flight conditions on the approach of the aircraft to computing means housing the interaction logic;
   c) interaction logic housed in control hardware, implemented in the form of control laws of control software, responsible for:
      coordinating a flight control sub-system and airflow control sub-system so that the sub-systems work together to control the aircraft;

listing coordinated operation of the flight control system of the aircraft, the control system of the aircraft collecting and immobilizing means and the airflow control means;

providing instructions which must be fulfilled by each of the control systems such that controlled and safe operation of the aircraft inside the air produced by the laminar air flow rate generating system is achieved.

2. The system according to claim 1, wherein the laminar airflow generating means comprise:
   a pooling chamber responsible for containing a specific volume of air in thermodynamic conditions provided by the air potential generating means;
   at least one purge valve responsible for relieving pressure of the pooling chamber when the purge valve is activated to obtain the thermodynamic conditions;
   at least one nozzle responsible for exchanging the thermodynamic conditions of the air contained in the pooling chamber with conditions necessary to form a laminar air current having a section suited to the aircraft;
   a plurality of horizontal guide blades and vertical guide blades responsible for varying the direction of the generated laminar air current to perform a lateral and vertical control of said air current, respectively.

3. The system according to claim 1, wherein the airflow control means comprise:
   sensor means responsible for obtaining the conditions of the laminar air current and the state of the air potential generating means and the laminar airflow generating means;
   control means configured for controlling the air potential generating means and the laminar airflow generating means depending on control signals;
   data processing means responsible for generating said control signals in real time, depending on the information supplied by the sensor means, in cooperation with the flight control system of the aircraft and with the interaction logic, depending on approach conditions and the trajectory calculation by the control hardware housing the interaction logic.

4. The system according to claim 1, wherein the aircraft collecting and immobilizing means comprise:
   a landing platform which can be lifted by an articulated mechanism;
   lifting means of the landing platform for lifting the landing platform and bringing the landing platform closer to the aircraft when the aircraft is in the collection area;
   fixing and anchoring device responsible for immobilizing the aircraft in the collection area;
   sensor means for establishing a position of the fixing and anchoring device and the position of the aircraft;
   control unit configured for controlling the lifting means of the landing platform and the actuation of the fixing and anchoring device, following a command generated by the interaction logic, in real time and in cooperation with the airflow control systems of the aircraft, depending on the position of the aircraft and on the conditions of the generated current.

5. The system according to claim 4, wherein the fixing and anchoring device comprises a battery of electromagnets arranged in the landing platform.

6. The system according to claim 5, wherein the fixing and anchoring device comprises a mechanical fixing of the landing gear of the aircraft.

7. The system according to claim 1, wherein the trajectory generating means comprise a first GPS unit in the not-on-board installation and data processing means configured for:
   receiving the GPS position from the first GPS unit;
   receiving the GPS position of the aircraft from a second on board GPS unit;
   receiving the altitude of the aircraft from an altimeter on board the aircraft;
   generating the trajectory depending on at least:
      readings from the first and second GPS units;
      a reading from the on board altimeter;
      a reading from the on board and not-on-board air sensors.

8. The system according to claim 1, comprising a platform responsible for supporting the not-on-board installation.

9. The system according to claim 1, wherein the installation on board the aircraft additionally comprises immobilizing and anchoring means compatible with the aircraft collecting and immobilizing means of the not-on-board installation to jointly immobilize the aircraft in the collection area.

10. The system according to claim 5, wherein the immobilizing and anchoring means of the installation on board the aircraft comprise:
   a landing gear compatible with the aircraft collecting and immobilizing means of the not-on-board installation;
   a battery of electromagnets geometrically compatible with the electromagnets of the aircraft collecting and immobilizing means of the not-on-board installation;
   a control unit responsible for controlling the intensity of the electric current powering the battery of electromagnets of the aircraft depending on the position of the aircraft during the guiding maneuver and on the control commands generated by the interaction logic.

11. A method to assist conventional fixed-wing aircraft landing without a runway, comprising:
   generating an adjustable laminar air current directed against forward movement of the aircraft by a not-on-board installation;
   calculating an approach and collection strategy of the aircraft in real time by interaction logic, in cooperation with the airflow control system and the aircraft control system;
   providing the definition of a trajectory which must be followed by the aircraft to be guided to the collection area to glide slope generating means in real time and adapting the trajectory to conditions of a maneuver by the interaction logic;
   providing a strategy which must be followed by a flight control system of the aircraft to be guided to the collection area to the on board installation in real time and adapting the strategy to the conditions of the maneuver by the interaction logic;
   obtaining approach conditions of the aircraft in the not-on-board installation, in the on board installation and in the interaction logic;
   controlling the laminar air current with suitable conditions to maintain airworthiness of the aircraft depending on approach conditions of the aircraft and on a result from executing the interaction logic;
   controlling the aircraft to follow a generated glide slope depending on the conditions of the laminar air current and on the result from executing the interaction logic;
   immobilizing the aircraft in the collection area once the aircraft has reached said collection area by aircraft collecting and immobilizing means.

* * * * *